United States Patent [19]

Tlaker et al.

[11] 4,136,302
[45] Jan. 23, 1979

[54] CONTROL SYSTEM FOR MACHINE TOOL WITH HYDRAULICALLY STROKED CUTTER

[75] Inventors: Erich Tlaker; Clarence M. Nichols, both of Springfield, Vt.

[73] Assignee: Fellows Corporation, Springfield, Vt.

[21] Appl. No.: 758,321

[22] Filed: Jan. 10, 1977

[51] Int. Cl.² ............................................. G05B 19/24
[52] U.S. Cl. ...................... 318/39; 318/571; 90/11 R
[58] Field of Search .............. 82/140; 90/11; 318/571, 318/39

[56] References Cited
U.S. PATENT DOCUMENTS

| | | | |
|---|---|---|---|
| 3,579,070 | 5/1971 | Crocker et al. | 318/571 |
| 3,595,132 | 7/1971 | Thacker | 318/39 X |
| 3,720,120 | 3/1973 | Cutler | 318/571 X |
| 3,851,550 | 12/1974 | Schalles | 318/571 X |
| 3,934,185 | 1/1976 | Schoonover et al. | 318/571 X |
| 3,975,667 | 8/1976 | Bory et al. | 318/571 X |

Primary Examiner—B. Dobeck
Attorney, Agent, or Firm—McCormick, Paulding & Huber

[57] ABSTRACT

A control system for a machine tool, such as a gear shaper, having a hydro-mechanically stroked cutter spindle, controls the stroking speed of the spindle, the feed of a workpiece relative to a cutter or other tool carried by the spindle, and the pressure of the fluid supplied to the hydraulic portion of the spindle stroking mechanism in such a way as to improve the efficiency of the machine both with regard to the time required to complete a given job and with regard to power consumption. The work force exerted by the spindle during its work stroke may be maintained within a selectable maximum limit and the cutter spindle stroking position is remotely adjustable to bring it into proper working relationship with a workpiece or to raise it to an elevated position to bring it out of working relationship with the workpiece. Various different stroking speeds of the spindle and various different feed rates of the workpiece relative to the spindle are available to suit different job requirements. The control system is also adjustable to adapt it to different stroke lengths and return speed ratios of the spindle.

22 Claims, 5 Drawing Figures

CONTROL SYSTEM FOR MACHINE TOOL WITH HYDRAULICALLY STROKED CUTTER

BACKGROUND OF THE INVENTION

This invention relates to machine tools having hydromechanically stroked cutter spindles, and deals more particularly with a control system for such a machine.

The control system of this invention, in some or all of its aspects, may be applied to various different machines wherein a cutter or other tool is carried by a repetitively reciprocated or stroked spindle powered by pressurized hydraulic fluid. An example of such machine is a gear shaper as described in the U.S. patent application of Tlaker and Hazeltine filed simultaneously with this application. For the purpose of the following description, the machine tool with which the control system is associated is taken to be such a gear shaper and reference may be had to said Tlaker and Hazeltine application for further details of a hydro-mechanical mechanism for stroking the spindle.

The use of a hydro-mechanical means for stroking the spindle of a machine tool permits certain control flexibility not available with previous machines having spindles mechanically driven by linkages, racks and pinions, or the like and the general object of this invention is to provide a control system taking advantage of this control flexibility to provide a machine having significant performance and productivity improvements over prior machines.

Assuming that the machine in question is a gear shaper, such machine requires the incorporation of certain motions at controlled velocities within certain distances. Some of the important ones of these factors are: (a) the control of the stroking speed (stroke cycles/minute) of the cutter spindle to permit the cutting of workpieces of various materials and sizes, (b) the location of the cutter spindle stroking position in proper relationship to the workpiece, (c) the speed at which the workpiece and cutter spindle are rotated relative to one another to provide a rotary feed which determines the amount of material removed from the workpiece during each cutting stroke of the spindle and results in a certain cutting force, and (d) the rate at which the cutter axis is moved toward or away from the workpiece axis to feed the cutter into cutting depth and the distance it must travel to reach such cutting depth. A more particular object of the invention is, therefore, to provide a control system which conveniently satisfies the needs dictated by these factors.

In the gear shaper disclosed herein, the hydromechanical stroking mechanism is adjustable to provide the cutter spindle with selectively different stroke lengths and selectively different return speed ratios. A further object of the invention is, therefore, to provide a control system adaptable to accommodate such stroke length and return speed ratio changes.

Still other objects of the invention are to provide a control system to control the cutting force exerted by the cutting spindle to either maintain the cutting force within a selected maximum limit or to maintain a constant cutting force during a cutting operation, to control the hydraulic supply pressure and flow in response to existing cutting force and spindle stroking speeds to conserve energy and to protect against overspeed and hydraulic failure conditions, to minimize the time required for the non-productive return stroke of the spindle, to minimize the time required for the cutter to reach the desired depth cut during depth feed by providing a variable rate of depth feed which starts at a high value and diminishes to a lower value as the tool approaches the desired depth of cut position, and to provide a cutter spindle positioning means which permits the cutter spindle to be positioned in response to remote electrical inputs.

Other objects and advantages of the invention will be apparent from the following description and the drawings forming a part hereof.

BRIEF DESCRIPTION OF THE DRAWINGS

FIG. 2 is a diagram illustrating the manner in which FIGS. 1a, 1b, 1c and 1d are oriented relative to one another to form FIG. 1.

SUMMARY OF THE INVENTION

This invention resides in a control system for a machine tool having a hydro-mechanically stroked cutter spindle and the pressure of the hydraulic fluid applied to the spindle driving piston face during the work stroke being detected and used as a cutting force or load pressure input signal to the control system. The control system includes means responsive to this load pressure signal to maintain the supplied hydraulic fluid pressure at a value not significantly higher than required for the job at hand. It also includes means for comparing the load pressure signal with a selected cutting force limit signal and to modify the operation of the machine, if necessary as a result of such comparison, to maintain the cutting force at or below the selected limit.

The invention resides also in the stroking speed of the spindle being directly related to the speed of a stroking motor and in a means for adding to the signal which controls the speed of the stroking motor, but only during return strokes of the spindle, a speed increase signal which increases the return speed of the spindle to or toward a maximum design return speed to thereby reduce the stroke cycle time and increase the productivity of the machine.

The invention also resides in the control system including a means for providing a variable rate of depth feed whereby the depth feed rate is high at the beginning of depth feed where cutting conditions are usually easy and whereby the depth feed rate diminishes toward a final or basic rate as the cutting approaches the depth of cut position where cutting conditions are usually more difficult.

The invention also resides in the control system including an electrical system for manually adjusting the work position of the spindle relative to the workpiece and for elevating the spindle from working relationship with the workpiece, the means in question accommodating the fact that as the spindle stroke length is increased the potential for spindle work position adjustment is decreased and also accommodating the fact that as the spindle work position is raised the potential for further elevation of the spindle to bring the cutter out of working relationship with the workpiece is decreased.

The invention also resides in the control system also providing for the control of hydraulic pressure in response to the rate of reciprocation of the cutter spindle.

DESCRIPTION OF THE PREFERRED EMBODIMENT

GENERAL ORGANIZATION

Figure 1A:
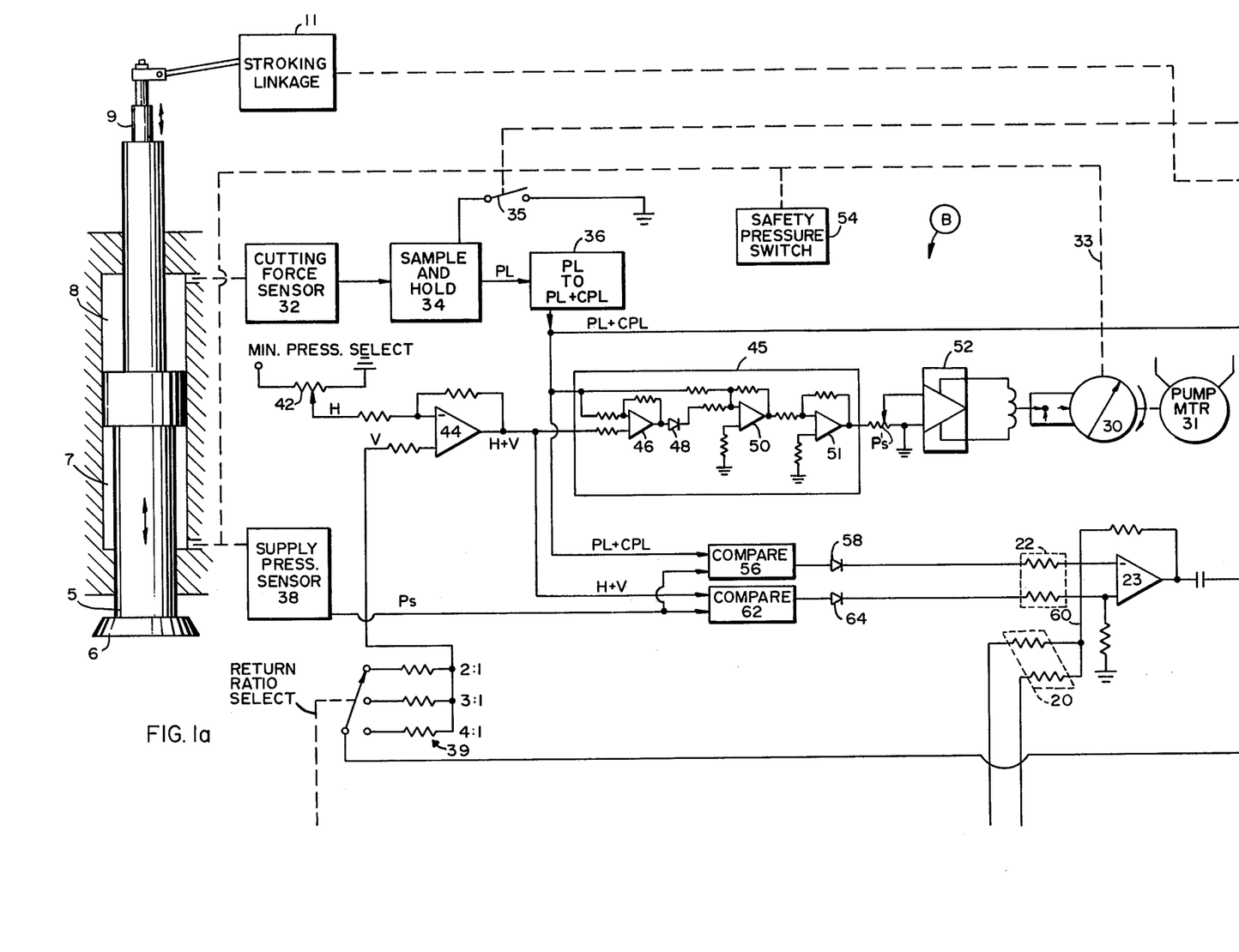
FIGS. 1a, 1b, 1c and 1d are portions of a complete figure and, when put together as shown in FIG. 2, form such a complete figure hereinafter referred to as FIG. 1, said FIG. 1 being a schematic diagram illustrating a machine tool and an associated control system embodying this invention.
Figure 1B:
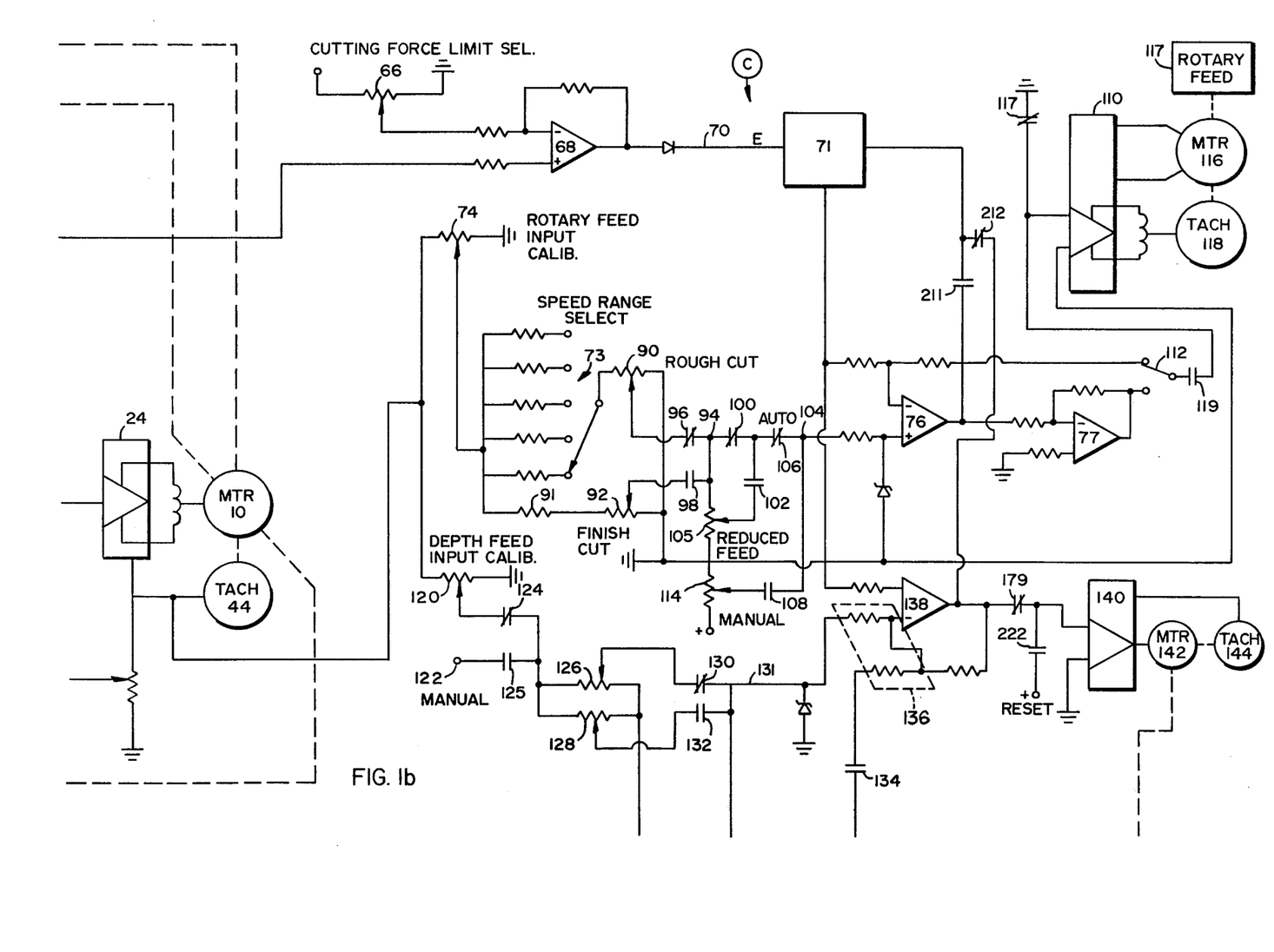
Figure 1C:
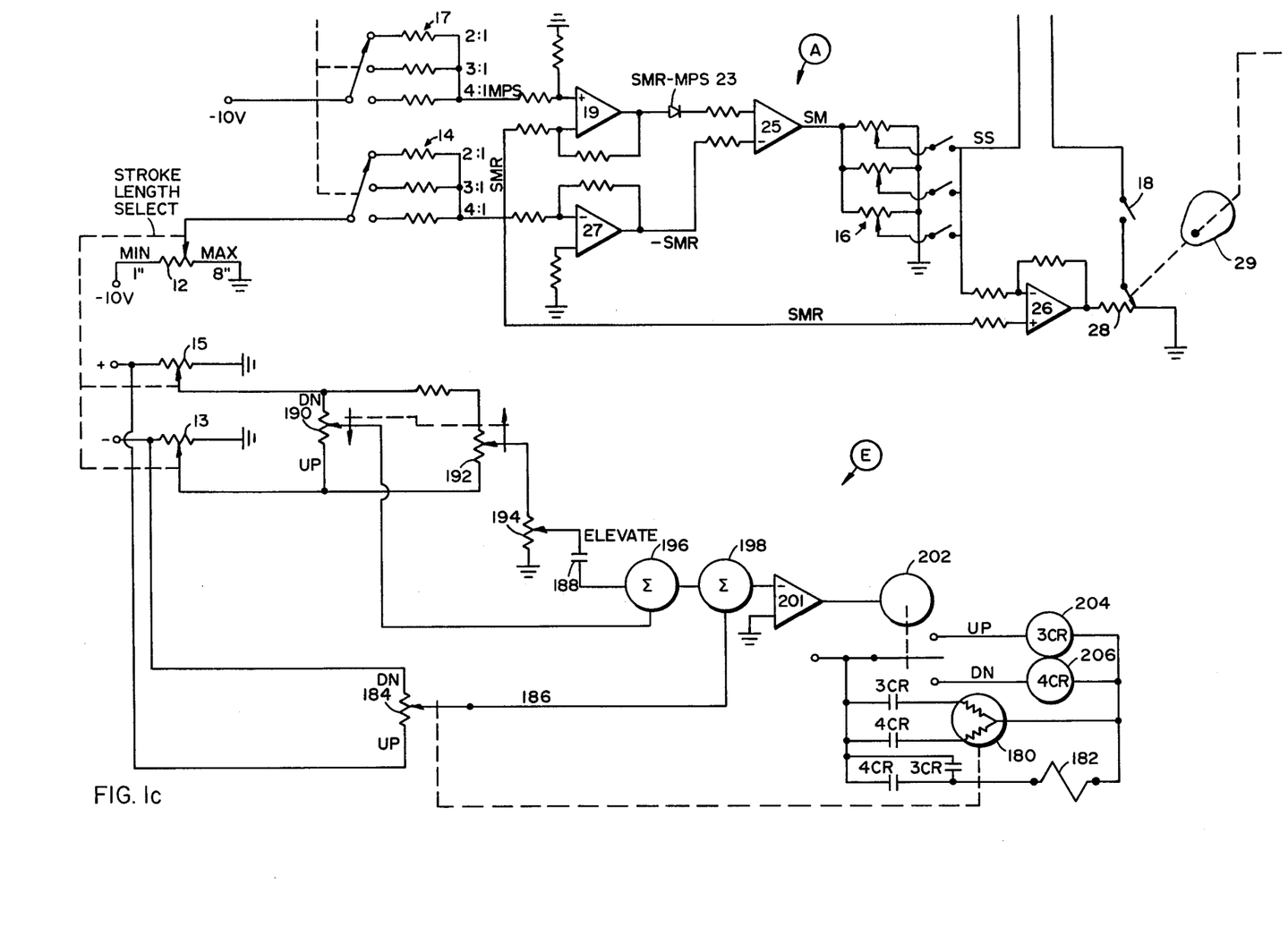
Figure 1D:
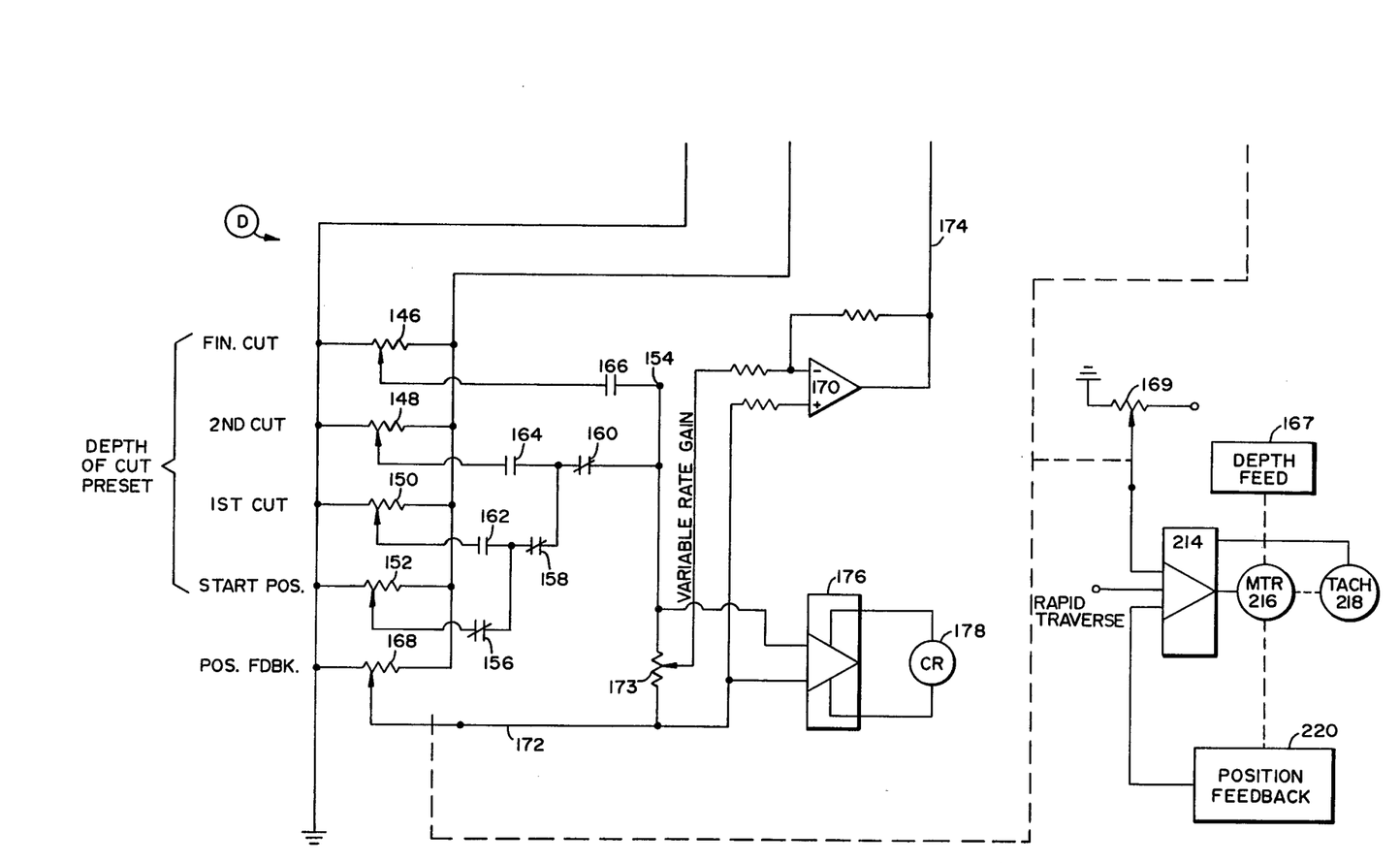
Figure 2:
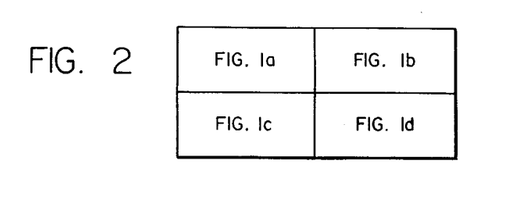

Referring to FIG. 1, the control system of this invention is shown schematically in association with a machine tool having a vertically reciprocable cutter spindle 5 carrying a cutter 6 at its lower end. The movement of the cutter spindle 5 is effected and controlled by a hydro-mechanical system including a servo valve 9, the servo valve being part of a servo system operable to valve hydraulic fluid between the illustrated smaller and larger piston area chambers 7 and 8 and a drain so that the spindle 5 is slaved to follow the up and down motion of the servo valve. The servo valve 9 is in turn stroked by a stroking linkage or mechanism 11 driven by a stroking motor 10. The stroking linkage 11 is such as to produce one cycle of reciprocation of the servo valve 9 for each N rotations of the motor 10, and it is manually adjustable to vary both the stroke length and return speed ratio of the servo valve 9, and correspondingly the stroke length and return speed ratio of the spindle 5, the return speed ratio being the ratio of the speed of the spindle or servo valve during its return or up stroke as compared to its speed during its down or cutting stroke.

The specific form of the cutter spindle, its hydraulic servo system and the associated stroking linkage 11 may vary widely without departing from the invention. However, in the present instance, these parts are taken to be those of a gear shaper such as shown in the previously mentioned patent application filed simultaneously herewith and reference may be had to said application for further details of such parts.

The cutter 6 and the workpiece may be fed relative to one another by either or both of a rotary feed drive mechanism 117 powered by a rotary feed motor 116 and a depth feed mechanism 167 powered by a depth feed motor 216. By operation of the rotary feed mechanism, the cutter and workpiece are both rotated simultaneously about center axes. By operation of the depth feed mechanism 167, the center axis of the cutter is moved toward or away from the center axis of the workpiece.

The parts described above comprise essentially the basic machine to which the control system of this invention applies, and the remainder of FIG. 1 illustrates the control system itself. The overall control system in turn is comprised of a number of smaller interrelated systems or subsystems indicated generally at A, B, C, D and E. System A is a stroking control system for controlling the speed of the stroking motor 10 to provide various different spindle stroking speeds (stroke cycles/minute) and which enables, under favorable circumstances, the speed of the stroking motor to be increased during the return strokes of the spindle to increase the efficiency of the machine by reducing the return stroke time.

The system indicated at B is a hydraulic pressure control system which is responsive to a number of different variables, including actual cutting force, to keep the hydraulic supply pressure above a given minimum value which varies with stroking speed, but otherwise at a level no more than needed for the job at hand to conserve energy and yet avoiding excessive forces exceeding the capacity of the machine. It also functions to provide protection against hydraulic pressure failure, excessive stroking speed and excessive supply pressure.

System C controls the rotary feed, through the rotary feed mechanism 117 and associated motor 118; and, system D controls the depth feed, through the depth feed mechanism 167 and associated motor 216. Both these systems are coupled with the stroking motor in such a way as to each provide, in one mode of operation, a fixed amount of feed per cutting stroke of the spindle. These two systems are also coupled with a cutting force limit selector 66 and with the hydraulic pressure control system B in such a manner as to maintain the total feed, whether entirely rotary feed, entirely depth feed or combined rotary and depth feed, at such a value as to keep the actual cutting tool force within the limit set by the limit selecting means. Lastly, the system E is a system for controlling the vertical position of the cutter relative to the workpiece and for elevating the cutter as, for example, to pass it over workpiece obstructions.

STROKING SPEED CONTROL

The stroking speed of the cutter spindle 5 and cutter 6 is directly related to the speed of the stroking motor 10 which drives the stroking linkage or mechanism 11 to mechanically reciprocate the servo valve 9 at a manually adjustable stroke length and at several different manually selectable return speed ratios. By way of example, in the illustrated case, the stroke length is selectively variable, by adjustment of the stroking linkage 11, between a minimum stroke length of one inch and a maximum stroke length of eight inches, and the stroking linkage 11 is manually adjustable to provide a selected one of three available return speed ratios, these being a ratio of 2:1, a ratio of 3:1 and a ratio of 4:1.

The stroking speed control system operates to control the speed of the stroking motor 10 and the system indicated generally at A in FIG. 1. To adjust the control system for changes in the return speed ratio, made by adjusting the stroking linkage 11, the system includes three three-position switches 14, 17 and 39 the movable contacts of which are ganged to operate in unison. Thus, if the stroking linkage 11 is adjusted to provide a 2:1 return speed ratio, the three switches 14, 17 and 39 are likewise manually set to their 2:1 ratio positions. Similarly, adjustment of the stroking linkage 11 to provide different stroke lengths may be compensated for in the control system by three stroke length potentiometers 12, 13 and 15 the wipers of which are ganged to move in unison. Thus, if the stroking linkage 11 is set to provide a six inch stroke length, the wipers of the potentiometers 12, 13 and 15 are set to corresponding six inch stroke positions.

The switch 17 provides an output signal MPS establishing a maximum permissible stroking speed for the particular selected return speed ratio in question. As a general rule, as the return speed ratio increases, the maximum stroking speed of the machine may be reduced, and therefore, the three resistors connected with the three fixed contacts of the switch 17 are chosen so that the signal MPS reduces as the return speed ratio setting selected by the movable contact is increased.

The spindle 5, during its up or return stroke also has a maximum design velocity which should not be exceeded. The stroking speed corresponding to such maximum spindle return speed velocity is a function of both the return speed ratio and the stroke length. A signal SMR representing such maximum stroking speed during return stroke of the piston is provided by the switch 14 and potentiometer 12. For any particular stroking speed, the cutting stroke and return stroke velocities of the spindle will vary with the stroke length, the velocities being high for high stroke lengths and low for low stroke lengths. Thus, for long stroke lengths the permissible stroking speed, to remain within the maximum design return stroke velocity, is less than for short stroke lengths. The arrangement of the potentiometer 12 is therefore such that the SMR signal, for any given return speed ratio setting of the switch 14, decreases as the stroke length setting is increased.

The MPS signal and the SMR signal are combined by summing amplifiers 19 and 25, inverting amplifier 27 and diode 23 to produce an output signal SM from the amplifier 25 which is equal to SMR if SMR is less than or equal to MPS and which is equal to MPS if SMR is greater than MPS. The signal SM is the signal which truly defines the maximum possible stroking speed, and from the foregoing it will be obserbed that this signal in turn can never be greater than SMR and therefor can never call for a stroking speed causing the spindle to be driven at a return speed exceeding the return speed maximum design value. A fundamental stroking speed signal SS is derived from the maximum speed signal SM by a selector network 16 comprising three potentiometers and three manually operable switches intended to make available three different manually selectable stroking speeds. By these means, the basic stroking speed signal SS may be set to any value equal to or less than SM by appropriately adjusting the wipers of the three potentiometers and selectively closing one of the three associated switches.

If a return speed increase switch 18 is open, the selected stroking speed signal SS is supplied by itself, through the summing circuit 20 and an associated summing circuit 22, the function of which is hereinafter described, to a motor control circuit 24 for driving the stroking motor 10 at a speed directly related to the output from the summing amplifier 23. The signal SS is constant and, therefore, the stroking motor 10 is driven at a constant speed.

The signal SS corresponds to a stroking speed which is chosen to yield a desired cutter speed during the cutting stroke. But except when SS is equal to SMR, return stroke velocity dictated by the SS signal is less than the maximum design return stroke velocity and, to improve the efficiency of the machine the cutter could be driven at a faster return rate. To obtain such an increase in the return stroke speed, the return speed increase switch 18 is closed. When this is done, the signal SMR is compared with the signal SS by the subtractor 26 which produces an output equal to the difference between SMR and SS. This difference signal is applied to a potentiometer 28 having a wiper driven by a cam 29 in unison with the stroking motor 10. The profile of the cam 29 is such that during the cutting stroke of the spindle and cutter, the wiper of the potentiometer is positioned on ground so that no signal is sent to the summing circuit 20, and therefore the signal supplied to the stroking motor is the basic stroking speed signal SS. During the return stroke of the cutter, however, the cam 29 positions the wiper of the potentiometer 28 to pick up some voltage signal which through the summing circuit 20 is added to the basic stroking speed signal SS to increase the speed of the stroking motor 10. The profile of the cam 29 is further such as to favorably accelerate and decelerate the speed increase signal during the return stroke movement of the cutter.

CONTROL OF HYDRAULIC SUPPLY PRESSURE

The pressure of the hydraulic fluid supplied to the spindle is controlled by the system indicated generally at B. A variable displacement pump 30 is driven at a constant speed by a motor 31 and has its displacement controlled by a controller 52 responsive to an electrical input signal, the controller 52 operating to cause the pump to deliver fluid at the rate required by the spindle stroking mechanism and at a pressure dictated by its electrical input signal. The input signal to the controller 52, and in consequence the supply pressure of the fluid in the supply line 33, is controlled in response to a number of different variables to keep the supply pressure at a desired value, as discussed below.

The load pressure, that is the pressure of the hydraulic fluid supplied to the chamber 8 having the piston face of larger area, is monitored by a pressure transducer 32 which produces an analogous output voltage. This analog voltage is sensed during each cutting stroke by a sample and hold circuit 34, as a result of a "sample" signal provided during the cutting stroke by a switch 35 driven by the stroking motor 10, to produce an output signal $P_L$ directly related to the cutting force exerted by the cutter 6 on the workpiece. The circuit 36 adds a fraction of the $P_L$ voltage signal to itself to produce an output signal ($P_L + CP_L$) fractionally higher than $P_L$.

A pressure transducer 38 monitors the supply pressure and produces an electrical output signal $P_S$ directly related to the supply pressure.

A manually adjustable signal producing circuit 42 produces an output signal H designating a selected minimum value below which it is desired not to have the hydraulic supply pressure fall. Generally, the minimum pressure corresponding to this signal is one below which it is known or believed that the machine will not operate properly.

A further signal which influences the supply pressure is a voltage V directly related to the speed of the stroking motor 10 and derived from the output of an associated tachometer 44, which output is passed through the return speed ratio switch 39 to modify it in accordance with the selected return speed ratio. The resistors of the switch are chosen so that for any given speed of the motor 10 the signal V is increased as the switch is set to higher values of return speed ratio and decreased as the switch is set to lower values of return speed ratio. In any event, for any given return speed ratio, the signal V increases with increases in the spindle stroking speed and acts to increase the minimum supply pressure with increase in stroking speed.

The signal V is added to the signal H by the summing amplifier 44, to provide a signal (H + V) which represents the minimum pressure desired for the particular stroking speed and return speed ratio in question. This minimum pressure determining signal (H + V) is combined with the signal ($P_L + CP_L$) by the summing and amplifying circuit 45 consisting of subtractor 46, diode 48, adder 50, and inverter 51. The output of the subtractor 46 is (H + V) − ($P_L + CP_L$). If (H + V) is greater than ($P_L + CP_L$) the output of the subtractor 46 is positive and is passed by the diode 48 to the summing circuit 50 for summing with the signal ($P_L + CP_L$). If (H + V) is less than ($P_L + CP_L$), then no signal is passed to the adder 50. As a result, the output of the inverter 51 is a signal $P'_S$. If ($P_L + CP_L$) is lower than (H + V), then $P'_S$ will be equal to (H + V) so as to control the pump 30 through the control circuit 52 to maintain the supply pressure at the minimum value corresponding to (H + V). On the other hand, if ($P_L$ + $CP_L$) is greater than (H + V) then $P'_S$ will equal ($P_L$ + $CP_L$) so that the pump will be controlled to maintain the supply pressure at a value corresponding to ($P_L$ + $CP_L$) — that is the supply pressure will be maintained at a value fractionally higher than the load pressure.

A safety pressure switch 54 is provided to shut down the machine in the event of excessive supply pressure, but under normal operation, such excessive pressure should never be encountered.

From the foregoing, it will be noted that the hydraulic supply system normally operates to maintain the supply pressure slightly higher than the load pressure and the minimum difference between the two pressures will be a difference represented by the signal ($CP_L$). If, because of excessive stroking speeds or a malfunction of the hydraulic supply unit, this minimum difference is not maintained, an overspeed protection circuit comes into play to reduce the speed of the stroking motor to restore the minimum pressure difference. This protective circuit comprises the subtractor 56 which compares the signal ($P_L$ + $CP_L$) with the signal $P_S$. If the difference between these two signals is less than the desired difference, a signal is sent through the diode 58 to the summing circuit 22 where it is combined with the stroking speed control signal appearing on the line 60 to produce a modified stroking speed control signal slowing the speed of the stroking motor, thereby returning the stroking speed to a safe value.

The system described above normally operates to maintain at least a minimum value of supply pressure corresponding to the signal (H + V) which includes the velocity related component V. To protect against the possibility of the supply pressure not reaching this minimum value, a protective circuit comprising the subtractor 62 and diode 64 is provided. This subtractor 62 compares the signal (H + V), with the signal $P_S$ and produces an output signal, which is transmitted to the summing circuit 22, when $P_S$ is less than (H + V), this signal in turn reducing the speed of the stroking motor. This protective circuit, therefore, protects against hydraulic pressure failure or inadequate hydraulic pressure during idle or low cutting force conditions. It also regulates maximum acceleration rates by permitting the stroking speed to be increased only at a rate compatible with that at which the supply pressure can be raised by the pump 30.

CUTTING FORCE LIMIT CONTROL

Included in the overall control system of FIG. 1 is a means for regulating the maximum cutting force which can be exerted by the tool on the workpiece. This means includes a manually adjustable circuit 66 for producing a maximum force limit signal $F_M$. This maximum force limit signal is in turn compared by the subtractor 68 with the signal ($P_L$ + $CP_L$) which is directly related to the actual cutting force. If ($P_L$ + $CP_L$) is greater than $F_M$, then a signal E is produced on the line 70. When the signal E does appear, it is combined in a scaling circuit 71 with a feed signal $S_F$, derived from the rotary feed control system through contact 211 or from the depth feed control system through contact 212, to produce an excessive load output signal $E_L$. The scaler 71 is a multiplier which combines the inputs E and $S_F$ in accordance with the function $E_L$ = ($ES_F/C$), where C is 10 or some other number of similar magnitude. The signal $E_L$ is in turn passed to both the rotary feed drive and the depth feed drive systems to reduce either or both feeds and thereby to bring the actual cutting force back to within the limit set by the circuit 66. That is, if the actual cutting force exceeds the maximum limit value established by the circuit 66, then either the rotary feed or the depth feed or both (whichever is being used at the time) is modified to slow down the feed rate thereby causing the tool to take a smaller chip and thus reducing the cutting force and returning it to an acceptable value.

ROTARY FEED CONTROL

A basic input signal for the rotary feed control system, indicated generally at C, is derived from the stroking motor tachometer 44 and is passed through a calibration potentiometer 74. The output from the calibration potentiometer is passed to both a rough cut potentiometer 90, through a speed range selector switch 73 and to a finish cut potentiometer 92 through a fixed resistor 91. The five resistors of the speed range select switch are of different values. Therefore, the potentiometer 90 and speed range selector switch provide five different output signals for rough cut operation and the potentiometer 92 and resistor 91 provide a single output signal for finish cut operation. During rough cut operation, the selected rough cut rotary feed signal is passed on to the point 94 by the switch 96 being closed and the switch 98 being open, and during finish cut operation, the signal from the potentiometer 92 is passed on to the point 94 by the switch 98 being closed and the switch 96 being open.

If the machine is being operated at the time without simultaneous depth feed, then the signal at 94 is passed on to the point 104 by virtue of the switch 100 being closed and the switch 102 open. On the other hand, if the machine is being operated with simultaneous depth feed, then the switch 100 is open and the switch 102 closed so that a reduced value of rotary feed signal is transmitted to the point 104 because of the reduced feed potentiometer 105.

Finally, if the machine is being operated in an automatic rotary feed mode, then the automatic switch 106 is closed and the manual switch 108 opened so as to pass the signal at 104 to the input of the subtractor 76 where it is reduced by the output signal $E_L$ of the scaling circuit 71 in the event that the cutting force at that moment exceeds the value preset by the circuit 66.

The output of the subtractor 76 is passed to the rotary feed motor control circuit 110 through a switch 112 dictating reverse or forward feed direction, the amplifier 77 being an inverter. If manual rotary feed control is desired, the switch 106 is opened, the switch 108 closed and the wiper of the potentiometer 114 manually adjusted to provide a control signal for the control circuit 110. The control circuit 110 in turn controls the rotary feed motor 116 having an associated tachometer 118 to provide a velocity feedback signal. The rotary feed is activated or deactivated by the switches 117 and 119, the switch 199 being closed and the switch 117 being opened to activate the feed and the switch 119 being opened and the switch 117 closed to deactivate the feed. It will also be observed from the foregoing that during rotary feed in the automatic mode, and assuming that no excessive force signal $E_L$ is produced, the selected signal fed to the amplifier 76 is nevertheless, because of ultimately being derived from the tachometer 44, dependent on the stroking motor speed and therefore a given amount of rotary feed will be obtained per cutting stroke regardless of the stroking speed.

DEPTH FEED CONTROL

Depth feed, sometimes also called radial feed, is movement of the cutter and workpiece toward each other usually along a line connecting their centers, to bring the workpiece and the cutter to a center distance suitable for production of the desired workpiece profile.

In cases where the workpiece is a gear-like object, the depth feed and rotary feed are operated simultaneously at preset rates while the reciprocating cutter 6 removes with each cutting stroke an amount of material determined by their respective rates. The desired depth of cut may be reached in some instances by using very high depth feed rates and slow rotary feed rates within a very short arc of rotation of the workpiece or may be reached in other cases by utilizing very slow depth feed rates and very high rotary feed rates during several revolutions of the workpiece. After the desired depth of cut is reached in each case, cutting continues without further depth feed until the workpiece has rotated an additional 360° to produce the desired profile throughout its circumference.

The raw control signal for the depth feed system, indicated generally at D in FIG. 1, may be either a stroking speed related signal derived from the tachometer 44 through a calibration potentiometer 120 or may be a manually selected nonvelocity related signal derived from a manual input 122. The manual input 122 is primarily used for set up purposes. Selector contacts 124 and 125 are used to select between the two optionally available raw control signals. During a cutting cycle a stroking speed related signal is derived from the wiper of potentiometer 120 by two potentiometers 126 and 128 optionally selectable by contacts 130 and 132. Rate preset potentiometer 126 and contact 130 are used to provide a basic depth feed signal on line 131 during roughing cuts, and preset potentiometer 128 and contact 132 are used to provide a basic depth feed signal on line 131 during finish cuts.

The selected basic depth rate signal may be used either by itself to control the depth feed motor, in which case the feed progresses at a constant rate regardless of the position of the cutter, or it may be used in conjunction with a subsystem which adds to it an increment varying in value with displacement of the cutter from a predetermined end position, the increment decreasing in value as the cutter moves toward the end position. The subsystem which provides variable augmentation of the basic depth feed signal may be brought into and out of play by a selector switch 134. When the switch 134 is open, the basic infeed feed signal passes through the summing circuit 136 by itself, and when the switch is closed, the incremental signal provided by the subsystem is added to the basic signal by the summing circuit. In either case, the output of the summing circuit 136 is supplied to a subtractor 138, where it is reduced by the signal $E_L$ from the sealer 71 of the cutting force limiting circuit, if such signal is present. The signal $E_L$ results from the load pressure exceeding the maximum limit value established by the limit selector 66 and scaling circuit 71 and, therefore, in the subtractor 138 the signal $E_L$ is subtracted from the depth feed signal supplied from the summing circuit 136 to reduce the depth feed rate, thereby reducing the size of chip taken by the tool and accordingly reducing the load pressure to return it to within the limit preselected.

The output of subtractor 138 is in turn transmitted to a depth feed potentiometer drive control 140 which controls a motor 142 having an associated tachometer 144 for velocity feed back to control 140.

Motor 142 drives the wipers of position feed back potentiometers 168 and 169. The output of potentiometer 169 is passed to a depth feed control 214 which operates depth feed motor 216 having associated with it a tachometer 218 for velocity feed back and position feed back device 220.

Operation of motor 142 changes the wiper position of potentiometer 169 which produces an error (command) signal to control 214 and corresponding rotation of motor 216 which produces depth feed motion. This resultant depth feed motion changes the output of position feed back device 220 to a level sufficient to null the error signal from the potentiometer 169 in the familiar manner of a null seeking position servo.

The variable depth feed augmentation subsystem includes a number of end position defining potentiometers 146, 148, 150 and 152, the output of any one of which may be chosen and applied to the point 154 by opening and closing in proper combination a number of selector switches 156 to 166. In particular, the potentiometer 152 may be set to define the position of the cutter at the start of a cutting operation. The potentiometer 150 may be set to define the position of the cutter at the end of the first cut. The potentiometer 148 may be set to define the position of the cutter at the end of the second cut, and the potentiometer 146 set to define the position of the cutter at the end of the final cut. A position feedback potentiometer 168 has its wiper moved by the depth feed potentiometer drive motor 142 simultaneously with the wiper of the position input potentiometer 169 so that the voltage signal picked up by the wiper of the potentiometer 168 defines the actual or momentary cutter position. All of the potentiometers 146 to 152 and 168 are energized by the basic depth feed signal from the line 131 with the result that the incremental signal provided by the augmentation subsystem is scaled in accordance with the value of the basic depth feed signal. That is, if the basic depth feed signal is changed, as by switching from the roughing rate potentiometer 126 to the finishing rate potentiometer 128, or by increase of stroking speed, the augmentation signal is correspondingly increased.

The selected end position signal appearing at the point 154 is supplied to a subtractor 170, through a potentiometer 173, which compares it with the actual cutter position signal appearing on the line 172. The output of the subtractor 170 is an augmentation signal appearing on the line 174 which varies in value depending on the difference between the actual cutter position and the desired end position and on the setting of the potentiometer 173. The net effect is that the augmentation signal will be relatively high when the cutter is spaced some distance from a selected end point and will decrease in value as the cutter approaches such end point, the signal becoming zero when the selected end point is reached. The slope of the characteristic line defining the value of the augmentation signal as a function of cutter displacement from a selected end point is varied by the potentiometer 173. Accordingly, at the start of a cut, the cutter will be fed at a relatively high depth feed rate and the rate of depth feed will decrease as the cutter reaches the end position with the feed rate at the end position being a basic (non-augmented) feed rate as dictated by the basic feed rate signal on the line 131.

The actual cutter position signal from the line 172 and the selected end position from the point 154 are also supplied to a comparator 176 which operates to provide a signal terminating depth feed when the two signals reach comparison, the output of the comparator 176 being supplied to a depth feed terminating relay 178 which operates contacts 179 for this purpose. Thus, the depth feed of the cutter is automatically stopped when the selected end position is reached. After the completion of a cutting cycle, the wipers of potentiometers 168 and 169 are returned to a starting position defined by the output of potentiometer 152 at a rate governed by the input voltage supplied from the reset input 222 to the potentiometer drive 140.

SPINDLE STROKE POSITION AND ELEVATING CONTROL

The machine in question has a housing which carries the spindle 5. An index point fixed to the housing may be taken as a housing reference point and another index point fixed to the spindle may be taken as a spindle reference point. As the spindle reciprocates the spindle index has an average or middle position displaced a given distance from the housing index. For stroke lengths less than the available maximum, the stroking of the spindle may be varied to change the average position of the spindle index relative to the housing index.

Adjustment of the average spindle index position relative to the housing index may be made for two reasons: First, to bring the stroking motion of the tool into proper position relative to a workpiece during a cutting operation and, second to elevate the cutting tool to pass it over workpiece obstructions when moving from one cutting station to another.

The system for making this adjustment is indicated generally at E in FIG. 1. In particular, adjustment of the displacement of the spindle index average position from the housing index is performed by a syncro-driver 180 which adjusts an associated part of the stroking linkage 11. The syncro-driver operates in conjunction with an associated clamp operated by a solenoid 182, the clamp being released when the syncro is operated and returned to clamping condition when the syncro is de-energized to hold the adjustable part of the stroking linkage 11 in its new position. A position feedback potentiometer 184 is driven by the syncro and provides a voltage signal on the line 186 representing the actual position relative to the housing index of the spindle index average position.

The system also includes a first means for adjusting the average spindle index position during a cutting operation and another means for adjusting the elevated position to which the average index position is moved upon the actuation of an elevate switch 188. These means include a cutting stroke position potentiometer 190 ganged with an elevated position potentiometer 192. Both potentiometers are energized by the output signals from the ganged potentiometers 13 and 15, which output signals vary in accordance with the selected length of cutting tool stroke. That is, for a long selected stroke, little or no stroke length is available for adjustment purposes and accordingly little or no signal is sent to the potentiometers 190 and 192 whereas on the other hand, when a short stroke length is chosen, more potential for adjustment is available and accordingly a larger signal is sent to the potentiometers 190 and 192.

The wipers of the two potentiometers 190 and 192 are ganged to operate in unison and in such a manner, as seen in FIG. 1, that if one wiper is moved down the other is moved up. Thus, if the cutting stroke position potentiometer 190 is adjusted to call for the cutting stroke to occur at a high or up position, in which case there is little or no range left for further elevation, the elevated position potentiometer 192 is adjusted to provide a very small or zero signal on its wiper. On the other hand, if the cutting stroke position potentiometer 190 is set to call for a low cutter position, more possibility for cutter elevation exists and the wiper of the elevation potentiometer 192 is moved to pick up a higher voltage signal. The wiper of the potentiometer 192 in turn feeds another potentiometer 194 which is manually adjustable to provide a signal indicating the degree of elevation desired from the amount of elevation potential available.

When the elevate switch 188 is open, the output of the cutting stroke position potentiometer 190 is passed through the summming circuit 196 and is, in the summing circuit 198, subtracted from the output of the position feedback potentiometer 184. If the two signals do not match, the output from the circuit 198 will be either negative or positive and will, depending on polarity, energize the relay 202, through inverter 201, to energize either the relay 204 to raise the spindle or the relay 206 to lower the spindle, until the actual position reaches the dictated position. When the elevate switch 188 is closed, an additional signal, dictated by the settings of the potentiometers 192 and 194 is added to the cutting stroke position signal, in the adding circuit 196, to cause the spindle position to be adjusted upwardly by the amount called for by the elevate signal. When the elevate switch is released, the elevate signal is removed and the spindle position is returned to that called for by the cutting stroke position potentiometer.

We claim:

1. The combination in a machine tool of a reciprocable cutter spindle having a stroke cycle including a cutting stroke and a return stroke, a stroking motor, a hydro-mechanical means driven by said stroking motor for reciprocating said spindle at a stroking speed (stroke cycles per minute) directly related to the speed of said stroking motor, means providing a first electrical signal representing a fundamental stroking speed, means providing a second electrical signal representing a stroking speed corresponding to a predetermined maximum return stroke velocity of said spindle, means providing a difference signal representing the difference between said first and second signals, a signal summing circuit, motor control means connected with the output of said summing circuit and with said stroking motor for driving said stroking motor at a speed directly related to said output of said summing circuit, said summing circuit having two inputs, means continuously supplying to one of said inputs said first electrical signal, and means for supplying to the other of said summing circuit inputs at least a fraction of said difference signal during only the return strokes of said spindle.

2. The combination defined in claim 1 further characterized by said hydro-mechanical means being adjustable to vary the ratio of the return stroke spindle speed to the cutting stroke spindle speed, and means for selectively adjusting both of said first and second electrical signals to provide different values of said first and second electrical signals for different values of said speed ratio.

3. The combination defined in claim 1 further characterized by said hydro-mechanical means being adjustable to vary the length of stroke of said spindle, and means for selectively varying said second electrical signal to lower its value as said stroke length is increased and to raise its value as said stroke length is decreased.

4. The combination defined in claim 3 further characterized by circuit means limiting said first signal to a value no greater than the value of said second signal.

5. The combination defined in claim 1 further characterized by said means for supplying at least a fraction of said difference signal to the other of said summing circuit inputs during only the return strokes of said spindle being a device having an input terminal to which said difference signal is supplied, an output terminal connected to said other input of said summing circuit, and a movable member controlling the amount of the input terminal signal supplied to said output terminal and movable over a range including one position at which no portion of said input terminal signal is supplied to said output terminal, and a cam driven by said stroking motor for moving said movable member, said cam having a profile such as to position said movable member at said one position during said cutting stroke of said spindle and at other positions during said return stroke of said spindle.

6. The combination defined in claim 1 further characterized by a switch for selectively completing or interrupting the supply of said at least a fraction of said difference signal to said other of said summing circuit inputs.

7. The combination in a hydro-mechanically operated machine tool of a repetitively reciprocable work spindle having for each cycle of reciprocation a work stroke and a return stroke, a tool carried by said spindle for working on a workpiece, means for reciprocating said spindle including means defining a piston chamber to which hydraulic fluid is supplied to drive said spindle during each work stroke, means for feeding said spindle relative to a workpiece to feed said tool into said workpiece, means providing an electrical load pressure signal directly related to the pressure prevailing in said piston chamber during work strokes of said spindle, means providing a work force limit signal representing a desired maximum limit for the force exerted by said tool on a workpiece, and means for slowing the rate at which said feed means feeds said spindle relative to a workpiece in the event said load pressure signal exceeds said work force limit signal, said means for feeding said spindle relative to a workpiece being a rotary feed mechanism for rotating said spindle and workpiece relative to one another about respective axes.

8. The combination in a hydro-mechanically operated machine tool of a repetitively reciprocable work spindle having for each cycle of reciprocation a work stroke and a return stroke, a tool carried by said spindle for working on a workpiece, means for reciprocating said spindle including means defining a piston chamber to which hydraulic fluid is supplied to drive said spindle during each work stroke, means for feeding said spindle relative to a workpiece to feed said tool into said workpiece, means providing an electrical load pressure signal directly related to the pressure prevailing in said piston chamber during work strokes of said spindle, means providing a work force limit signal representing a desired maximum limit for the force exerted by said tool on a workpiece, and means for slowing the rate at which said feed means feeds said spindle relative to a workpiece in the event said load pressure signal exceeds said work force limit signal, said means for feeding said spindle relative to a workpiece being a depth feed mechanism for feeding the axis of said spindle toward or away from the axis of said workpiece.

9. The combination defined in claim 8 further characterized by means providing an end position signal defining an end position to which said spindle axis is to be moved by said depth feed mechanism during depth feeding of said spindle relative to a workpiece, and means providing a depth feed rate signal the value of which is directly dependent on the displacement of said spindle axis from said end position so as to decrease as said spindle axis approaches said end position, and means for causing said depth feed mechanism to move said spindle axis toward said end position at a rate dependent on said depth feed rate signal.

10. The combination in a machine tool of a reciprocable cutter spindle having a stroke cycle including a cutting stroke and a return stroke, a hydro-mechanical means for reciprocating said spindle at a selectively variable stroking speed (stroke cycle per minute), a feed mechanism for feeding said spindle relative to a workpiece at a speed directly related to a feed rate signal, and means producing a signal directly related to said stroking speed of said spindle and for providing said signal to said feed mechanism as said feed rate signal whereby said spindle is moved at a feed rate directly related to said stroking speed.

11. The combination in a machine tool of a reciprocable cutter spindle having a stroke cycle including a cutting stroke and a return stroke, a stroking motor, a hydro-mechanical means driven by said stroking motor for reciprocating said spindle at a stroking speed (stroke cycle per minute) directly related to the speed of said stroking motor, a feed mechanism for feeding said spindle relative to a workpiece at a speed directly related to a feed rate signal, means producing a signal directly related to the speed of said stroking motor and means for providing a selectable fraction of said stroking motor speed signal to said feed mechanism as said feed rate signal whereby said spindle is moved at a feed rate directly related to said stroking speed.

12. The combination in a machine tool of a repetitively reciprocable work spindle having for each cycle of reciprocation a work stroke and a return stroke, a tool carried by said spindle for working on a workpiece, a depth feed mechanism for feeding the axis of said spindle toward or away from the axis of such workpiece, means providing an end position signal defining an end position to which said spindle axis is to be moved by said depth feed mechanism during depth feeding of said spindle relative to a workpiece, and means providing a depth feed rate signal the value of which is directly dependent on the displacement of said spindle axis from said end position so as to decrease as said spindle axis approaches said end position, and means for causing said depth feed mechanism to move said spindle axis toward said end position at a rate dependent on said depth feed rate signal.

13. The combination defined in claim 12 further characterized by said means providing a depth feed rate signal including a means providing a basis signal, means providing an augmentation signal the value of which is directly dependent on the displacement of said spindle axis from said end position and which becomes zero as said spindle axis reaches said end position, and means for adding said basic signal to said augmentation signal to provide said depth feed rate signal.

14. The combination defined in claim 13 further characterized by means for varying the slope of the augmentation signal value versus displacement of said spindle axis from said end position characteristic.

15. The combination defined in claim 12 further characterized by means providing a plurality of different selectively available end position signals.

16. The combination defined in claim 12 further characterized by means for varying said depth feed rate signal in direct relation to changes in the stroking speed (stroke cycles/minute) of said spindle.

17. The combination defined in claim 12 further characterized by a hydro-mechanical means for reciprocating said work spindle and including means defining a piston chamber to which hydraulic fluid is supplied to drive said spindle during each work stroke, means providing an electrical load pressure signal directly related to the pressure prevailing in said piston chamber during work strokes of said spindle, means providing a work force limit signal representing a desired maximum limit for the force exerted by said tool on a workpiece, and means operable in the event said load pressure signal exceeds said work force limit signal to reduce said depth feed rate signal.

18. The combination in a machine tool of a reciprocable work spindle having a stroke cycle including a cutting stroke and a return stroke, a housing carrying said spindle and relative to which said spindle reciprocates, said spindle having an index point fixed relative thereto which during reciprocation of said spindle has an average position displaced a given distance from a corresponding index point fixed to said housing, means for varying the length of stroke of said spindle, an adjustment member movable to different positions to vary the displacement of said spindle index average position from said housing index, means providing a desired work stroke position signal representing a desired displacement of said spindle index average position from said housing index during working of a workpiece, and means for controlling said adjustment member in response to said desired work stroke position signal to cause the actual displacement of said spindle index average position from said housing to correspond to that represented by said desired work stroke position signal.

19. The combination defined in claim 18 further characterized by means for scaling the signal provided by said desired work stroke position signal providing means in accordance with changes in the stroke length of said spindle.

20. The combination in a machine tool of a reciprocable work spindle having a stroke cycle including a cutting stroke and a return stroke, a housing carrying said spindle and relative to which said spindle reciprocates, said spindle having an index point fixed relative thereto which during reciprocation of said spindle has an average position displaced a given distance from a corresponding index point fixed to said housing, means for varying the length of stroke of said spindle, an adjustment member movable to different positions to vary the displacement of said spindle index average positions from said housing index, means providing a desired work stroke position signal representing a desired displacement of said spindle index average position from said housing index during working of a workpiece, means providing a desired elevated stroke position signal representing a desired elevated displacement of said spindle index average position from said housing index during nonworking of a workpiece, control means for controlling said adjustment member in response to an input command signal to cause the actual displacement of said spindle index average position from said housing to correspond to that represented by said command signal, and means for selectively supplying either said desired work stroke position signal or said desired elevated stroke position signal to said control means as said command signal.

21. The combination in a machine tool of a reciprocable work spindle having a stroke cycle including a cutting stroke and a return stroke, a housing carrying said spindle and relative to which said spindle reciprocates, said spindle having an index point fixed relative thereto which during reciprocation of said spindle has an average position displaced a given distance from a corresponding index point fixed to said housing, means for varying the length of stroke of said spindle, an adjustment member movable to different positions to vary the displacement of said spindle index average position from said housing index, means providing a desired work stroke position signal representing a desired displacement of said spindle index average position from said housing index during working of a workpiece, means providing an elevate signal, means for adding said elevate signal to said desired work stroke position signal to produce an elevated stroke position signal representing a desired elevated displacement of said spindle index average position from said housing index during nonworking of a workpiece, means for varying both said desired work stroke position signal and said elevate signal inversely with changes in the stroke length of said spindle, means for varying said elevate signal inversely with changes in said desired work position signal, control means for controlling said adjustment member in response to an input command signal to cause the actual displacement of said spindle index average position from said housing to correspond to that represented by said command signal, and means for selectively supplying either said desired work stroke position signal or said desired elevated stroke position signal to said control means as said command signal.

22. The combination in a machine tool of a repetitively reciprocable work spindle having for each cycle of reciprocation a work stroke and a return stroke, a tool carried by said spindle for working on an associated workpiece, a stroking motor, a hydro-mechanical means driven by said stroking motor for reciprocating said spindle at a stroking speed (stroke cycles per minute) directly related to the speed of said stroking motor, said hydro-mechanical means including means defining a piston chamber to which hydraulic fluid is supplied to drive said spindle during each work stroke, means providing an electrical load pressure signal directly related to the pressure prevailing in said piston chamber during work strokes of said piston, a source of hydraulic fluid supplied at a supply pressure to said spindle reciprocating means, means controlling said supply pressure of said hydraulic fluid in response to said load pressure signal, a depth feed mechanism for feeding the axis of said spindle toward or away from the axis of a workpiece, means for providing an end position signal defining an end position to which said spindle axis is to be moved by said depth feed mechanism during depth feeding of said spindle relative to a workpiece, means providing a depth feed rate signal the value of which is dependent on the displacement of said spindle axis from said end position so as to decrease as said spindle axis approaches said end position, means for causing said depth feed mechanism to move said spindle axis toward said end position at a rate dependent on said depth feed rate signal, means providing a work force limit signal representing a desired maximum limit for the force exerted by said tool on a workpiece, means operable in the event said load pressure signal exceeds said work force limit signal for reducing said depth feed rate signal to reduce the rate of depth feed by said depth feed mechanism and to thereby return said load pressure signal to a value no greater than said work force limit signal, means providing a first signal representing a fundamental stroking speed, means providing a second signal representing a stroking speed corresponding to a predetermined maximum return stroke velocity of said spindle, means providing a difference signal representing the difference between said first and second signals, a signal summing circuit, motor control means connected with the output of said summing circuit and with said stroking motor for driving said stroking motor at a speed directly related to said output of said summing circuit, said summing circuit having two inputs, means continuously supplying to one of said inputs said first electrical signal, means for supplying to the other of said summing circuit inputs at least a fraction of said difference signal during only the return strokes of said spindle, a housing carrying said spindle and relative to which said spindle reciprocates, said spindle having an index fixed relative thereto which during reciprocation of said spindle has an average position displaced a given distance from a corresponding index point fixed to said housing, means for varying the length of stroke of said spindle, an adjustment member movable to different positions to vary the displacement of said spindle index average position from said housing index, means providing a desired work stroke position signal representing a desired displacement of said spindle index average position from said housing index during working of a workpiece and means for controlling said adjustment member in response to said desired work stroke position signal to cause the actual displacement of said spindle index average position from said housing to correspond to that represented by said desired work stroke position signal.

* * * * *